Figure 1:
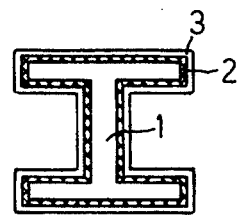

United States Patent [19]

Adlerborn et al.

[11] 4,112,143
[45] Sep. 5, 1978

[54] METHOD OF MANUFACTURING AN OBJECT OF SILICON NITRIDE

[75] Inventors: Jan Adlerborn; Hans Larker, both of Robertsfors, Sweden

[73] Assignee: ASEA Aktiebolag, Sweden

[21] Appl. No.: 760,463

[22] Filed: Jan. 18, 1977

[51] Int. Cl.$^2$ ............................................. C04B 33/34
[52] U.S. Cl. .................................... 427/191; 264/62; 264/65; 264/66; 264/93; 264/102; 264/111; 264/113; 264/131; 264/313; 264/332; 427/193; 427/204; 427/369; 427/370
[58] Field of Search ...................... 264/62, 88, 89, 93, 264/111, 131, 313, 332, 102, 60, 113, 65, 66; 427/191, 193, 204, 369, 370

[56] References Cited

U.S. PATENT DOCUMENTS

| | | | |
|---|---|---|---|
| 3,394,026 | 7/1968 | Parr | 264/62 |
| 3,455,682 | 7/1969 | Barbaras | 264/332 X |
| 3,535,154 | 10/1970 | Meyer-Simon | 264/62 X |
| 3,622,313 | 11/1971 | Havel | 264/332 X |
| 3,631,583 | 1/1972 | Holler | 264/111 X |
| 4,023,966 | 5/1977 | Loersch | 264/332 X |
| 4,041,123 | 8/1977 | Lange | 264/332 |

Primary Examiner—Thomas P. Pavelko
Attorney, Agent, or Firm—Watson, Cole, Grindle & Watson

[57] ABSTRACT

A method for manufacturing an object of silicon nitride by isostatic pressing of a preformed body of silicon nitride powder utilizing a pressure medium at a temperature sufficiently high to sinter the silicon nitride. The preformed body is subjected to a degassing operation before isostatic pressing. An inner porous layer of a first material and then an outer porous layer of a second material are applied on the preformed powder body. The inner porous layer is transformable, at a temperature below the sintering temperature for silicon nitride, into a pressure medium impermeable layer. The outer porous layer is also transformable into a pressure medium impermeable layer, but at a temperature which is lower than the temperature when the inner porous layer is converted into its pressure medium impermeable form. Thus, the preformed body is first subjected to a degassing and to a heating to the temperature for transforming the outer porous layer into a pressure medium impermeable layer while the inner porous layer is maintained in a porous form. Thereafter the preformed body and the surrounding layers are heated further to the temperature for converting the inner porous layer into its pressure medium impermeable form while a pressure greater than the gas pressure inside the layers is maintained on the outside of the layers. The isostatic pressing of the preformed object is then carried out.

8 Claims, 2 Drawing Figures

METHOD OF MANUFACTURING AN OBJECT OF SILICON NITRIDE

In the manufacture of objects of silicon nitride with high density (more than 90% of the theoretical density) by sintering together powder, the use of isostatic pressing offers many advantages. Thus, the manufactured objects will have approximately the same strength in all directions because of the all-sided pressure, which is not the case with other methods of manufacture. Furthermore, objects of complicated shapes can be manufactured directly by the pressing and without, or substantially without, a subsequent machining by means of tools, for example by grinding, which is exceedingly important because of the fact that silicon nitride has a very great hardness. One further important property of isostatic pressing is that the use of press tools is avoided and thus also the very considerable material problems connected therewith, which problems are caused by the high pressures and temperatures, at least 20 MPa and 1600° C., respectively, which are required.

Prior to the isostatic pressing and the sintering together of the silicon nitride powder in connection therewith, it is suitable that the powder is preformed into a manageable powder body by subjecting the powder to a compaction, for example arranged in a sealed capsule of yielding material, such as a plastic capsule. The compaction can be performed with advantage without the use of a temporary binder at a pressure of at least 100 MPa at room temperature or another temperature which is considerably lower than the temperature during the compression in connection with the sintering. The product can thereafter be given its desired shape by means of machining. For the preforming it is also possible to employ, among other things, conventional techniques for manufacturing ceramic goods. The silicon nitride powder is then usually mixed before the forming with a temporary binder, for example methyl cellulose, cellulose nitrate, an acrylic binder, a wax or a mixture of waxes. After the preforming the binder is driven off by heating so that the preformed powder body becomes substantially free from binder.

Since the preformed powder body is subjected to the isostatic pressing at the sintering temperature, it must, in order to give a desired, dense sintered product, be enclosed in a casing capable of being evacuated before the pressing and which, during pressing, is able to prevent the pressure medium used in this connection, normally a gas, from penetrating into the powder body. The casing must of course also have a sufficiently high strength or viscosity during the pressing in order not to penetrate into the pores of the powder body. If a preformed capsule of glass is used as the casing, which then has to be of a high-melting type in order not to run away or penetrate into the powder body at the high sintering temperature, it can not be prevented that the glass, when softening, is collected in pockets and other recesses of the preformed powder body. This often leads to fracture at projecting portions of the sintered object during its cooling because of differences in the coefficient of thermal expansion of silicon nitride and glass. Instead, the casing can be allowed to form on the spot by dipping the preformed powder body in a suspension of particles of high-melting glass or in some other way surrounding the body with a layer of particles of such glass, and then heating the powder body under vacuum at such a temperature that the particles form a dense casing around it. The last-mentioned method permits the application of a casing which can be made thin and which conforms to the shape of the powder body, thus avoiding accumulations of glass on the sintered object as well as the disadvantages associated therewith. However, the method has one serious drawback connected with the fact that a dense casing is only achieved at high temperatures since the glass has to be of high-melting type in order not to run away or penetrate into the powder body during the sintering of the silicon nitride. The fact that a dense casing is achieved only at high temperatures means that dissociation of the silicon nitride under departure of nitrogen cannot be avoided, which results in a deteriorated quality of the object as sintered.

The present invention will solve the problem of achieving a dense casing around a preformed powder body of silicon nitride, which does not give rise to harmful accumulations of glass on the sintered body and which prevents a harmful dissociation of the silicon nitride. According to the invention, this makes possible the manufacture of complicated parts of silicon nitride with a homogeneous composition and with homogeneous properties.

The present invention relates to a method of manufacturing an object of silicon nitride by isostatic pressing of a preformed body of silicon nitride powder with a pressure medium at a temperature required for sintering of the silicon nitride, the preformed body being subjected to a degassing prior to the isostatic pressing, characterised in that on the preformed powder body there are applied an inner porous layer of a first material and outside this an outer porous layer of a second material, the inner porous layer, possibly in cooperation with the second material, being transformable into a layer impermeable to the pressure medium at a temperature below the sintering temperature for the silicon nitride, and the outer porous layer being transformable into a layer impermeable to the pressure medium at a temperature which is lower than that for the inner porous layer, whereafter the preformed body is first subjected to a degassing and to a heating to a temperature required for forming a layer, impermeable to the pressure medium, of the outer porous layer but which maintains the inner porous layer porous, and then to a heating to a temperature required for forming a layer, impermeable to the pressure medium, of the inner porous layer while maintaining a pressure outside said layers which is greater than the gas pressure inside these layers, and that the isostatic pressing of the preformed product is then carried out.

As said first material in the inner porous layer there may be used a powder of a high-melting glass such as Vycor glass containing 96.7 percent by weight $SiO_2$, 2.9 percent by weight $B_2O_3$ and 0.4 percent by weight $Al_2O_3$, further quartz glass and mixtures of particles of substances, for example $SiO_2$ and $B_2O_3$, which, during heating, form a gas-impermeable glass layer. It is also possible to use as said first material in the inner porous layer a powder of a high-melting metallic material capable of forming a metallic layer impermeable to the pressure medium, such as molybdenum, tungsten and other refractory metals.

As said second material in the outer porous layer there may be used a powder of a low-melting glass such as Pyrex glass containing 80.3 percent by weight $SiO_2$, 12.2 percent by weight $B_2O_3$, 2.8 percent by weight $Al_2O_3$, 4.0 percent by weight $Na_2O$, 0.4 percent by weight $K_2O$ and 0.3 percent by weight CaO, further an aluminium silicate containing 58 percent by weight $SiO_2$, 9 percent by weight $B_2O_3$, 20 percent by weight $Al_2O_3$, 5 percent by weight CaO and 8 percent by weight MgO, an aluminium silicate containing 60 percent by weight $SiO_2$, 20 percent by weight $Al_2O_3$, 15 percent by weight CaO and 5 percent by weight MgO, and mixtures of particles of substances, for example $SiO_2$, $B_2O_3$, $Al_2O_3$ and alkali and earth alkali metal oxides which, during heating, form a gas-impermeable glass layer.

The two porous layers, each of which suitably has a thickness within the range of 0.05 to 1 mm, may, among other things, be applied by dipping the preformed powder body in suspensions of the particulate materials or by flame spraying or other thermal spraying. The particles may suitably have a grain size within the range of 0.1 to 100 microns.

The degassing is suitably started and is allowed to continue at room temperature for a period which is dependent on the size of the preformed powder body. Under continued evacuation, the temperature is raised so that the outer porous layer is transferred into a layer which is impermeable for the pressure medium. When this is done, pressure can be applied with a gaseous pressure medium on the enclosed powder body to counteract dissociation of the silicon nitride during continued temperature increase. During the continued increase in temperature, provided the layers consist of a glass or a glass-forming material, the glass in the outer layer reacts with the material in the inner porous layer while forming an increasingly high-melting glass and while maintaining a layer impermeable for the pressure medium, and finally a glass layer, impermeable for the pressure, is formed of the innermost part of the inner porous layer before the glass in the outer layer is able to run away. This last formed glass layer forms a dense casing around the powder body, when the isostatic pressing of the preformed product is carried out at the sintering temperature. When using a metallic material in the inner, porous layer and a glass or a glass-forming material in the outer porous layer, the glass layer formed from the outer porous layer acts as impermeable layer at least until the inner metallic layer has been transformed to an impermeable layer.

The temperature at which the outer porous layer is caused to be transformed into an impermeable layer lies suitably within the range of 600° to 1100° C., and the temperature at which the inner porous layer is caused to be transformed into an impermeable layer lies within the range 1300° to 1600° C. If the inner layer is compressed under isostatic pressure, which can be achieved after the outer layer has become gas-tight, there may, however, also be a question of temperatures of 1000° to 1300° C. For such a compression there is required a pressure of the order of magnitude of 20 to 300 MPa. The sintering of the powder body is carried out at at least 1600° C., preferably at 1600° to 1900° C. The pressure during the sintering of the preformed silicon nitride body is dependent on whether a sintering-promoting additive, such as magnesium oxide, has been added to the silicon nitride or not. If no such additive is used, the pressure should amount to at least 100 MPa, preferably to 200 to 300 MPa. When using a sintering-promoting additive, a lower pressure can be used, however suitably at least 20 MPa.

Figure 2:
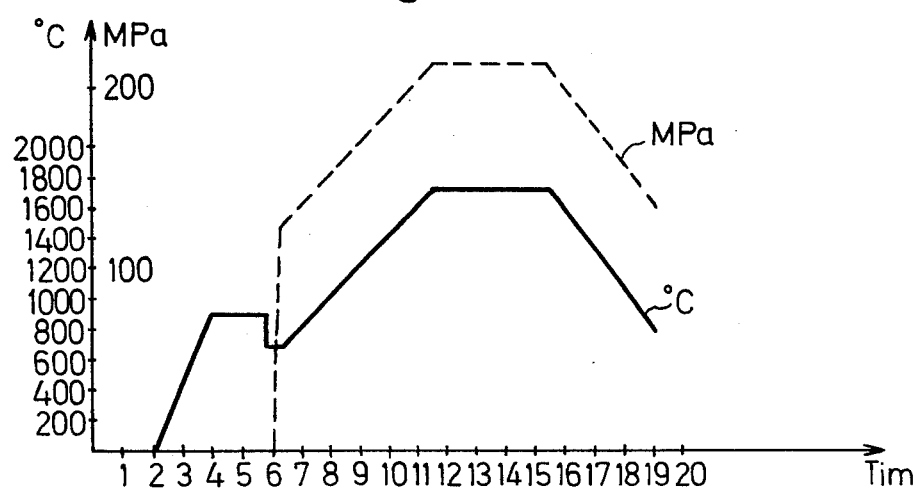

The invention will be explained in greater detail by describing an embodiment with reference to the accompanying drawing, in which FIG. 1 schematically shows a preformed powder body of silicon nitride provided with two porous layers, and FIG. 2 schematically a treatment cycle for manufacturing a sintered object of the preformed powder body.

Silicon nitride powder with a powder grain size below 7 microns and containing around 0.1 percent by weight of magnesium oxide is placed in a capsule of plastic, for example a softened polyvinyl chloride, or of rubber, having approximately the same shape as the preformed powder body to be manufactured, whereafter the capsule is sealed and placed in a press device, for example the device shown in FIGS. 1 and 2 of the U.S. patent application Ser. No. 627,688. The powder is subjected to a compaction at 600 MPa for a time of five minutes. After completed compaction the capsule is removed, and the preformed powder body thus manufactured is machined into the desired shape.

The preformed powder body 1 is then provided, as is clear from FIG. 1, with an inner porous layer 2 and an outer porous layer 3 by being dipped first in a water suspension of powder of a glass consisting of 96.7 percent by weight $SiO_2$, 2.9 percent by weight $B_2O_3$ and 0.4 percent by weight $Al_2O_3$ and then, after drying this layer, in a water suspension of a powder of a glass consisting of 80.3 percent by weight $SiO_2$, 12.2 percent by weight $B_2O_3$, 2.8 percent by weight $Al_2O_3$, 4.0 percent by weight $Na_2O$, 0.4 percent by weight $K_2O$ and 0.3 percent by weight CaO, followed by a renewed drying.

The preformed powder body thus treated is thereafter placed in a high-pressure furnace which is provided with a conduit through which gas can be discharged for degassing of the powder body and through which gas can be supplied for generating the required pressure for the isostatic pressing and which is provided with heating devices. Such a high pressure furnace is described, for example, in the previously mentioned U.S. patent application Ser. No. 627,688. As illustrated in FIG. 2, the preformed powder body is first degassed in the high pressure furnace at room temperature for approximately 2 hours. During continued evacuation the temperature is raised to about 900° C. The temperature is raised so slowly that the pressure does not exceed 0.1 torr during any part of the time. At about 900° C. the temperature is maintained constant for about 2 hours, the final degassing thus being performed and the glass powder in the outer porous layer sintering together into a gas-impermeable layer. To reduce the viscosity on the glass in the outer layer and thus reduce the risk of penetration of glass melt into the inner porous layer, the temperature is reduced to 700° C. Thereafter argon or helium is supplied to a pressure level which provides a pressure of 200 to 300 MPa at the final sintering temperature. The temperature is then raised to 1700° to 1800° C., that is, to a suitable sintering temperature for the silicon nitride. The pressure then rises simultaneously. This temperature increase is achieved sufficiently slowly for the molten glass in the outer layer to have time to react with the glass powder in the inner layer while forming an increasingly high-melting glass, and for the innermost layer of the glass powder in the inner layer to have time to sinter into a gas-impermeable layer before the glass in the outer layer is able to run off. A suitable time for sintering at 1700° to 1800° C. and 200 to 300 MPa is at least 2 hours, if no sintering-promoting additive is used and at least 0.5 hours if such additive is used. After a completed cycle, the furnace is allowed to cool to a suitable decharging temperature and the sintered object is blasted clean of glass.

If a binder, such as the previously exemplified methyl cellulose, cellulose nitrate, an acrylic binder, a wax or a mixture of waxes with different melting points, has been used in the manufacture of the preformed powder body, the binder is removed before or after the application of the porous layers, suitably by heating the powder body to 400° to 700° C. in vacuum. Thereafter degassing and further treatment can be done, as described for a preformed powder body without a binder.

The present invention is particularly suitable for use in series manufacture. In this case the various stages of treatment, such as (a) removal of the binder, (b) degassing in vacuum and dense sintering of the outer layer, (c) further heating of the parts in gas with pressure exceeding the pressure inside the layers, and (d) final heating and hot isostatic pressing, can be performed in different kinds of furnace equipment with transfer between them in hot condition.

As examples of objects for which the present invention is extremely well suited for use may be mentioned, among other things, vanes and monolithic turbine rotors for gas turbines.

We claim:

1. Method of manufacturing an object of silicon nitride by isostatic pressing of a preformed body of silicon nitride powder with a pressure medium at a temperature required for sintering the silicon nitride, the preformed body then being subjected to a degassing before the isostatic pressing, characterised in that on the preformed powder body there are applied an inner porous layer of a first material and outside this an outer porous layer of a second material, the inner porous layer being transformable into a layer, impermeable for the pressure medium, at a temperature below the sintering temperature for the silicon nitride and the outer porous layer being transformable into a layer, impermeable for the pressure medium, at a temperature which is lower than that for the inner porous layer, whereafter the preformed body is first subjected to a degassing and to a heating to a temperature which is required for the formation of a layer, impermeable for the pressure medium, of the outer porous layer but which maintains the inner porous layer porous, and then to a heating to a temperature which is required for the formation of a layer, impermeable for the pressure medium, of the inner porous layer while maintaining a pressure outside said layers which is greater than the gas pressure inside these layers, the isostatic pressing of the preformed product then being carried out.

2. Method according to claim 1, characterised in that as the first material there is used a high-melting glass or a high-melting glass-forming material.

3. Method according to claim 1, characterised in that as the first material there is used a high-melting metallic material.

4. Method according to any of claim 1, characterised in that as the second material there is used a low-melting glass or a low-melting glass-forming material.

5. Method according to any of claim 1, characterised in that the preformed body is heated to a temperature of 600° to 1100° C. for the formation of a layer of the outer porous layer which is impermeable to the pressure medium.

6. Method according to any of claim 1, characterised in that the preformed body is heated to a temperature of 1300° to 1600° C. for the formation of a layer of the inner porous layer which is impermeable to the pressure medium.

7. Method according to any of claim 1, characterised in that the preformed body is heated to a temperature of 1000° to 1300° C. under simultaneous isostatic compaction for forming of a layer of the inner porous layer which is impermeable to the pressure medium.

8. Method according to claim 2, characterized in that the first material of the inner porous layer is transformable into a pressure medium impermeable layer in cooperation with the second material of the outer porous layer.

* * * * *